(No Model.)

E. A. BARBER.
STORAGE BATTERY.

No. 603,229. Patented Apr. 26, 1898.

Witnesses
L. C. Hills.
a. R. Hough.

Edward A. Barber
Inventor

By his Attorney
Franklin H. Hough

UNITED STATES PATENT OFFICE.

EDWARD A. BARBER, OF WATERTOWN, NEW YORK.

STORAGE BATTERY.

SPECIFICATION forming part of Letters Patent No. 603,229, dated April 26, 1898.

Application filed September 13, 1897. Serial No. 651,474. (No model.)

*To all whom it may concern:*

Be it known that I, EDWARD A. BARBER, a citizen of the United States, residing at Watertown, in the county of Jefferson and State of New York, have invented certain new and useful Improvements in Storage Batteries; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in storage batteries; and it consists in a series of plates of any suitable construction, combined with separate and independent trays in which the positive plates are placed, suitable insulators placed between the positive and negative plates, and suitable metallic connections between the plates, as will be more fully described hereinafter.

The objects of my invention are to make the trays entirely separate and independent of the plates, so that the expansion and contraction of the plates will not injure or destroy the trays, as is the case where the plates and trays are made integral; to have the bottom of one tray below the top of the one below it, so that both the plates and connections will always be immersed in the electrolyte, and to make connection between the positive and negative plates through the sides of the trays.

Figure 1:
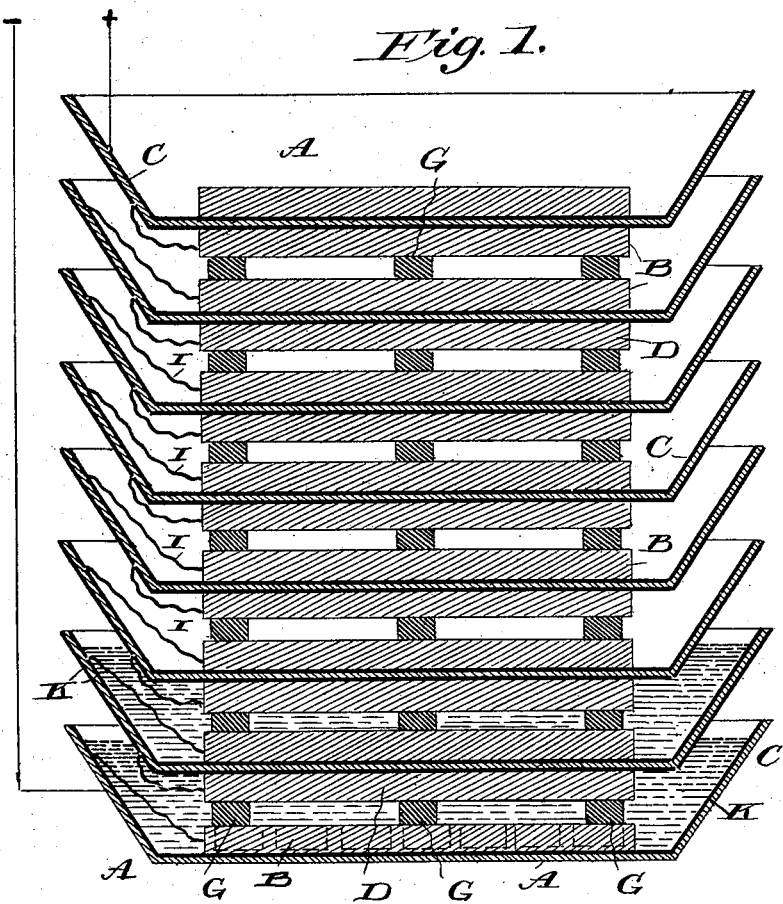
Figure 2:
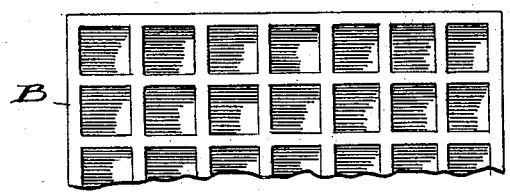
Figure 3:
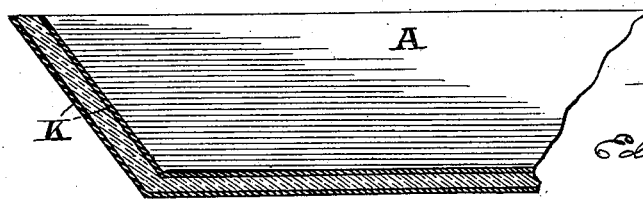

Figure 1 is a central vertical section through the stack of trays and the plates. Fig. 2 is a plan view of a portion of one of the plates carried in the trays, and Fig. 3 is an enlarged view showing in section one of the trays with the asphalt covering to the same.

A represents the trays, made, preferably, of lead and which are sufficiently deep to have the bottom of one tray set down in the one below it, so that the bottom of each tray, with the exception of the lowest one of the whole series, is immersed in the electrolyte, as well as the positive and negative plates, and the metallic connections placed in the trays. Where these trays are made of lead or metal, their positive sides are coated with asphalt K or other suitable material, and thus the trays are prevented from being gradually oxidized and destroyed. The metallic connections may also be coated, if so desired, with any suitable protecting compound.

The positive plates B are placed in the bottoms of the trays, and the negative plates D, both series of plates being made, preferably, of lead and having compartments filled with oxid of lead, are separated from the positive plates by the insulators G, and these plates are connected in pairs by the metallic connections I, which have their ends connected to the inner and outer sides of the trays and preferably below the electrolyte.

The trays are made separate from the plates, which are of any desired make, so that the expansion or contraction of the plates can take place without effecting the trays in any respect whatever. Where, as heretofore, the trays are made integral with the plates, the constant expansion and contraction of the plates is liable to injure or destroy the plates, and thus both the tray and the plate must be destroyed, as the plate cannot well be repaired. Where the plates are made separate from the trays, when a plate becomes injured, it can be removed and replaced by another without in any manner interfering with the tray.

Where the plates and trays are made integral, a certain construction must be followed; but where they are made separate any desired construction may be used.

As here shown, the sides or edges C of the trays are turned upwardly at any desired height, so as to project above the bottom of the tray placed above it, and thus enable the tray to hold not only a sufficient amount of electrolyte to always cover the two plates B and B placed therein, but to also immerse the metallic connections which have their outer and upper ends connected in any suitable manner directly to the sides of the trays, the positive connection being attached to the inner side of the tray and the negative to the outer one at a lower plane. Thus every part of the battery which is in active service is immersed in the electrolyte.

In the present construction I prefer to place the positive plates directly in the bottoms of the trays and the negative plates upon the tops of the insulators, which are placed upon the tops of the positive plates, and then the metallic conductors are attached to the inner and outer sides of the trays, as above described. The conducting-wires extend from the bottom and top plates and lead to lamps placed in any desired position. As the metallic straps or connections I move freely with the plates, the plates can expand and contract without forcing the trays out of shape or injuring the connections.

Having thus described my invention, I claim—

1. In a storage battery, a series of separate and independent superimposed oxidizable metal trays, the electrolyte therein, the asphalt covering for the surfaces of the trays exposed to the electrolyte, to prevent the trays from becoming gradually oxidized and destroyed, the positive and negative plates and the electrical connections between each of said plates, substantially as set forth.

2. In a storage battery, the series of superimposed metallic trays, the asphalt coverings for said trays as described, the independent positive plates resting on the bottom of the said trays, insulators across the positive plates, negative plates resting on the said insulators, combined with the independent metallic connection between each of the said plates and the side of the adjacent tray, which connections are wholly immersed in the electrolyte.

In testimony whereof I affix my signature in presence of two witnesses.

EDWARD A. BARBER

Witnesses:
IRVING J. MORRIS,
O. A. KLINE.